United States Patent Office 3,119,794
Patented Jan. 28, 1964

3,119,794
POLY-GAMMA-ESTERS OF OPTICALLY ACTIVE GLUTAMIC ACID
Louis de Vries, Kentfield, and John R. Thomas, Lafayette, Calif., assignors to California Research Corporation, San Francisco, Calif., a corporation of Delaware
No Drawing. Filed Sept. 6, 1960, Ser. No. 53,869
4 Claims. (Cl. 260—78)

This invention relates to superior new polymers. More particularly, this invention is concerned with novel high molecular weight polypeptides which exhibit remarkable thickening powers.

Constant effort is being made to produce lubricants which exhibit relatively little change in viscosity over a wide range of temperatures. Thus, in any application where a lubricant is subject to use in wide variations of temperature, it is desirable that the lubricant have not too high a viscosity at the lower temperatures, nor too low a viscosity at the higher temperatures. For effective lubrication the oil must not become so viscous at the lower temperatures so as to impede starting and cause excessive wear, and not become so thin at the higher temperatures so as to fail to provide adequate separation of the wearing surfaces.

With regard to lubricating oils, these desired viscosity-temperature characteristics may be obtained in some measure by the incorporation of certain synthetic products of large molecular size and comparative chemical inertness. These products are known as viscosity index (V.I.) improvers. However, any initial rise in V.I. attributable to the incorporation of the high molecular weight product will diminish upon operation of the machinery due to the shear forces set up by the moving parts of the machinery, for example, as in an internal combustion engine. These forces serve to shear the high molecular weight additive into component parts of lower molecular weight, yielding in turn a lower V.I. It can thus readily be seen that a high resistance to shear degradation is an exceptionally desirable property of a V.I. improver. A further highly desirable property of a V.I. improver is that the desired improvement in V.I. can be achieved by the addition to the lubricating oil of a small percent by weight of the additive.

It has now been found that a novel class of oil-soluble high molecular weight polypeptides derived from esters of optically-active glutamic acid exhibit remarkably each of the above described highly desirable properties. These novel polypeptides provide surprisingly effective thickening at low concentrations. Further, these novel polypeptides display a highly remarkable resistance to permanent shear degradation. This unusual combination of effective thickening power, low percent by weight additive requirement, and excellent shear strength, makes these novel polypeptides particularly desirable and useful as V.I. improvers.

These polypeptides may also be used as thickening agents in paints or asphalts. It has further been found that these novel polypeptides are surprisingly effective as anti-bleeding agents in greases.

The polypeptides of the present invention have the following general formula:

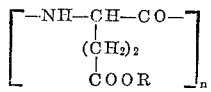

where R is selected from the group consisting of benzyl radicals and alkyl radicals containing from 8 to 18 carbon atoms. The benzyl radical will occupy from 0 to 30 mol. percent of the ester radical (R) positions and the alkyl radical will occupy from 70 to 100 mol. percent of the ester radical positions. The molecular weight of the polymer will range from 10,000 to 1,000,000 with "n" being the number of recurring units necessarily corresponding to the molecular weight.

These polyesters may be suitably prepared by trans-esterification of polybenzyl glutamate with the appropriate alcohol, or by direct synthesis from the glutamate monomer. The following specific examples will serve to illustrate the preparation of the products of the present invention, in particular, polylauryl glutamate.

EXAMPLE I

Trans-esterification of polybenzyl glutamate: A 14.49 g. quantity of poly-γ-benzyl-L-glutamate is dissolved in 250 cc. of dry chloroform. 170 cc. of dry lauryl alcohol is added with stirring and heating, along with 20 cc. of a mixture made from 7.86 g. of p-toluene sulfonic acid monohydrate and 600 cc. of benzene, wherein all water was removed by azeotroping. The mixture is refluxed for 48 hours, thereafter the solution is kept at 100° C. for 6 hours. At the end of this time no polymer should precipitate upon the addition of isooctane. The polymer is now precipitated by pouring the solution into excess methanol and filtering. The product is a white, fibrous polymer having a composition corresponding to 87% polylauryl glutamate and 13% polybenzyl glutamate, and having an estimated average molecular weight of about 150,000 as determined by viscosity measurements.

EXAMPLE II

Direct synthesis from the glutamate monomer: 145 g. of glutamic acid is suspended in a mixture of 1 liter of dry distilled lauryl alcohol and 1 liter of sodium dried dioxane. 2.50 ml. of concentrated HCl (36%) is added and the mixture heated at 70° C. with stirring until the glutamic acid is dissolved. The solution is cooled to room temperature and diluted with 2 volumes of ether. After 3 hours, the crystallization of lauryl glutamate hydrochloride is complete. The crystals are filtered and washed with pentane. Yield, 43.5 g. of the hydrochloride as shimmering flakes. Then the anhydride is prepared by suspending 60 g. of the hydrochloride in dry chloroform and bubbling phosgene through the refluxing solution with vigorous stirring until a clear solution is obtained (approx. 6 hours). After vacuum removal of the excess phosgene and solvent the residue is diluted with a dry n-heptane and the solution cooled to 0° C. Crystallization, initiated by scratching, is complete after 12 hours. After filtration the solution is recrystallized at −30° C., collected and dried. Yield, 25 g. of the anhydride as colorless flakes. Polymerization is accomplished by dissolving 5 g. of the anhydride in 100 cc. of dry benzene and adding 0.1 cc. of a solution of 36 mg./cc. of triethylamine in dry benzene. After standing for 40 hours, the viscous solution is poured into methanol and the precipitated polymer collected by filtration. The polylauryl glutamate product is a white, fibrous solid somewhat sticky to the touch. Yield, 95% completion of the reaction based upon the anhydride.

|  | C | H | N |
| --- | --- | --- | --- |
| Calculated | 68.63 | 10.52 | 4.70 |
| Found | 68.53 | 10.38 | 4.92 |

The superior properties of these novel polyglutamates are illustrated by their remarkable effect in lubricating oils and greases, as shown by data compiled in the following tables.

In Table I various amounts of the polyglutamate are incorporated in solvent-refined 150 neutral mineral lubricating oil in terms of percent by weight, and the improvement in viscosity and the surprising resistance to shear degradation corresponding to the low percent by weight polyglutamate additive is observed. The V.I. is determined by ASTM Standard Method D-567-41. The shear loss is determined by applying shear forces in the form of cavitations induced by ultrasonic waves and measuring the change in viscosity at 210° F. before and after cavitation. The polyglutamate employed is the transesterification reaction product of poly-γ-benzyl-L-glutamate and lauryl alcohol, having a composition corresponding to approximately 90% polylauryl glutamate and 10% polybenzyl glutamate. Samples numbers 1 through 5 have an average molecular weight of about 500,000 and sample number 6 has an average molecular weight of about 160,000.

Table I

OIL-POLYGLUTAMATE SOLUTION PROPERTIES

| Sample No. | Percent by Weight Polyglutamate in 150 N Oil | Viscosity Saybolt Seconds Universal at 210° F. | Viscosity Index | Percent Shear Loss (Δ Viscosity at 210° F.) |
|---|---|---|---|---|
| 1 | 0.0 | 42.2 | 87 | |
| 2 | 0.085 | 79.9 | | |
| 3 | 0.13 | 59.6 | 120 | 42.8 |
| 4 | 0.18 | 59.6 | 119 | 56.3 |
| 5 | 0.26 | 52.5 | | 10.9 |
| 6 | 0.5 | 67.2 | 120 | 2.8 |

Table II illustrates the superior thickening power of the above described polyglutamate as compared to commercially acceptable V.I. improvers. Acryloid 763 is a polymethacrylate V.I. improver having an average molecular weight of about 400,000, sold by Rohm & Haas. Paratone N is a polybutylene V.I. improver having an average molecular weight of about 120,000, sold by Enjay Co. The amount of additive that must be incorporated in 150 N oil to raise the viscosity of the oil at 210° F. to 67.2 SSU is measured and compared.

Table II

COMPARATIVE THICKENING POWERS

| | Polyglutamate | Acryloid 763 | Paratone N |
|---|---|---|---|
| Weight percent additive required to yield oil of equal viscosity | 0.5 | 3.05 | 3.0 |

Table III illustrates the superior shear performance of the present invention as compared to the above mentioned commercial additives. The shear loss is determined by the method described above. The oil tested is at an additive concentration that will yield an oil of 67.2 viscosity, SSU at 210° F.

Table III

COMPARATIVE SHEAR STRENGTH

| | Polyglutamate | Acryloid 763 | Paratone N |
|---|---|---|---|
| Percent Shear Loss (Δ Viscosity 210° F.) | 2.8 | 30.0 | 6.0 |

From the tests in Table I, it will be seen that each of the illustrative compositions containing the polyglutamate thickener possess remarkably improved viscosity-temperature properties compared to the base oil alone. Further, this improvement in viscosity-temperature behavior is achieved with the incorporation of a surprisingly small percent by weght of the polyglutamate, as is illustrated by Table II above. By comparison, commercially acceptable V.I. improvers such as the Acryloids or Paratones are normally employed in the amount of 1 to 5% by weight of the lubricating oil solution, whereas, approximately 1/10 of a percent by weight of the present invention provides sufficient thickening. Specifically, to raise the viscosity of 150 Neutral oil to 67.2 SSU at 210° F., 6 times more Acryloid 763 or Paratone N is required than is required of the polyglutamate thickener; see Table II.

Similarly, it can be seen from Table III that, for an oil-additive solution of a viscosity of 67.2 SSU at 210° F. the present invention displays a 2.1 times greater shear strength than Paratone N and a 10.6 times greater shear strength than Acryloid 763.

Table IV which follows, lists data showing the superior effects of the above-described polyglutamate as an antibleeding agent in grease.

The base grease is a polypropylene glycol base oil thickened with 11.7% by weight of sodium-N-octadecyl terephthalamate.

The oil separation was determined by the Federal Standard 791—Method 321 at 210° F.

Table IV

| | Sample 1 | Sample 2 |
|---|---|---|
| (A) Grease Composition: | | |
| Base Grease, Percent | 100 | 99 |
| Polyglutamate, Percent | | 1 |
| (B) Physical Characteristics: | | |
| ASTM dropping Point, °F | 466 | 456 |
| ASTM Worked penetration, $P_{60}$ at 77° F | 309 | 346 |
| Oil Separation, Percent | 3.9 | 1.6 |

As can be seen, an addition of only 1% by weight of the polyglutamate reduces grease bleeding by over 50% as compared to the base grease alone.

We claim:

1. Poly-gamma-esters of optically active glutamic acid consisting essentially of recurring units of the following formula:

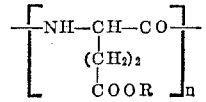

wherein said gamma-ester R radicals are selected from the group consisting of alkyl and benzyl radicals, with a major proportion of from 70 to 100 mol percent of the total R radicals consisting of alkyl radicals containing from 8 to 18 carbon atoms and the corresponding remaining proportion of from 0 to 30 mol percent of the total R radicals consisting of benzyl radicals, the molecular weight of the polyesters ranging from 10,000 to 1,000,000 and $n$ representing the number of recurring units corresponding to said molecular weight.

2. Poly-gamma-esters of optically active glutamic acid consisting essentially of recurring units of the following formula:

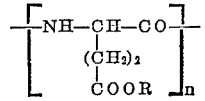

wherein said gamma-ester R radicals are selected from the group consisting of lauryl radicals and benzyl radicals, with a major proportion from 70 to 100 mol percent of the total R radicals consisting of lauryl radicals and the corresponding remaining proportion of from 0 to 30 mol percent of the total R radicals consisting of benzyl radicals, the molecular weight of the polyesters ranging from 10,000 to 1,000,000 and $n$ representing the number of recurring units corresponding to said molecular weight.

3. Poly-gamma-esters of optically active plutamic acid consisting essentially of recurring units of the following formula:

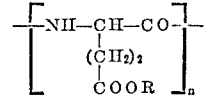

wherein said gamma-ester R radicals are selected from the group consisting of n-octyl radicals and benzyl radicals, with a major proportion from 70 to 100 mol percent of the total R radicals consisting of n-octyl radicals and the corresponding remaining proportion of from 0 to 30 mol percent of the total R radicals consisting of benzyl radicals, the molecular weight of the polyesters ranging from 10,000 to 1,000,000 and $n$ representing the number of recurring units corresponding to said molecular weight.

4. Poly-gamma-esters of optically active glutamic acid consisting essentially of recurring units of the following formula:

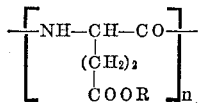

wherein said gamma-ester R radicals are selected from the group consisting of tridecyl radicals and benzyl radicals, with a major proportion from 70 to 100 mol percent of the total R radicals consisting of tridecyl radicals and the corresponding remaining proportion of from 0 to 30 mol percent of the total R radicals consisting of benzyl radicals, the molecular weight of the polyesters ranging from 10,000 to 1,000,000, and $n$ representing the number of recurring units corresponding to said molecular weight.

References Cited in the file of this patent

UNITED STATES PATENTS 2,438,091  Lynch _____ Mar. 16, 1948

OTHER REFERENCES

Hanby et al.: Jour. Chem. Soc., 1950, pages 3239–3249.
Bamford et al.: Synthetic Polypeptides, Academic Press Inc., New York, 1956, pages 42, 44, 51, 52 and 316–318.